United States Patent
Park

(10) Patent No.: US 9,983,430 B2
(45) Date of Patent: May 29, 2018

(54) DISPLAY PANEL INCLUDING A VERIFICATION CODE AND DISPLAY DEVICE HAVING THE SAME

(71) Applicant: Samsung Display Co., Ltd., Yongin-si (KR)

(72) Inventor: Minwook Park, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days. days.

(21) Appl. No.: 15/819,777

(22) Filed: Nov. 21, 2017

(65) Prior Publication Data
US 2018/0095321 A1    Apr. 5, 2018

Related U.S. Application Data

(63) Continuation of application No. 14/611,371, filed on Feb. 2, 2015, now Pat. No. 9,851,597.

(30) Foreign Application Priority Data

Mar. 11, 2014  (KR) ........................ 10-2014-0028446

(51) Int. Cl.
*G02F 1/1335* (2006.01)
*G02F 1/1345* (2006.01)

(52) U.S. Cl.
CPC .... *G02F 1/133512* (2013.01); *G02F 1/13454* (2013.01)

(58) Field of Classification Search
CPC ........ G02F 2001/133354; G02F 2001/133374; G02F 1/133608; H01L 2223/54406; H01L 2223/54433
See application file for complete search history.

(56) References Cited

U.S. PATENT DOCUMENTS 6,667,792 B2    12/2003    Park et al.
6,734,931 B2    5/2004    Yu
(Continued)

FOREIGN PATENT DOCUMENTS

JP    2003-241675    8/2003
JP    2006-243007    9/2006
(Continued)

OTHER PUBLICATIONS

Non-Final Office Action dated Jan. 26, 2017 in U.S. Appl. No. 14/611,371.
(Continued)

*Primary Examiner* — Tracie Y Green
(74) *Attorney, Agent, or Firm* — H.C. Park & Associates, PLC

(57) ABSTRACT

A display panel including: a first base substrate including a display area and a peripheral area adjacent to the display area; a signal line disposed on the first base substrate and disposed in the display area; a thin film transistor disposed on the first base substrate and disposed in the display area; a verification code part disposed on the first base substrate and disposed in the peripheral area; a second base substrate facing the first base substrate; and a light blocking layer overlapping the peripheral area in a plan view. The verification code part includes a code portion having an identification mark, and a peripheral portion adjacent to the code portion, in which the light blocking layer overlaps at least a portion of the peripheral portion in a plan view.

7 Claims, 10 Drawing Sheets

(56) References Cited

U.S. PATENT DOCUMENTS

| | | |
|---|---|---|
| 7,253,428 B1 | 8/2007 | Little |
| 7,714,961 B2 | 5/2010 | Bae et al. |
| 7,771,618 B2 | 8/2010 | Lin et al. |
| 8,582,073 B2 | 11/2013 | Yamazaki |
| 2002/0062787 A1 | 5/2002 | Hasnizume et al. |
| 2006/0279687 A1 | 12/2006 | Park et al. |
| 2014/0146166 A1 | 5/2014 | Shin |
| 2015/0015553 A1 | 1/2015 | Cho et al. |
| 2015/0016090 A1 | 1/2015 | Lee et al. |

FOREIGN PATENT DOCUMENTS

| | | |
|---|---|---|
| KR | 10-0993455 | 11/2010 |
| KR | 10-2015-0008639 | 1/2015 |
| KR | 10-2015-0009058 | 1/2015 |
| KR | 10-2015-0069716 | 6/2015 |

OTHER PUBLICATIONS

Notice of Allowance dated Aug. 10, 2017 in U.S. Appl. No. 14/611,371.

DISPLAY PANEL INCLUDING A VERIFICATION CODE AND DISPLAY DEVICE HAVING THE SAME

CROSS-REFERENCE TO RELATED APPLICATION

This application is a Continuation of U.S. patent application Ser. No. 14/611,371, filed on Feb. 2, 2015, and claims priority from and the benefit of Korean Patent Application No. 10-2014-0028446, filed on Mar. 11, 2014, which are hereby incorporated by reference for all purposes as if fully set forth herein.

BACKGROUND

Field

Exemplary embodiments relate to a display panel and a display device with the display panel. More particularly, the present disclosure relates to a display panel capable of reducing a width of a bezel of a display device and a display device having the display panel.

Discussion of the Background

In general, a liquid crystal display device includes a liquid crystal display panel configured to include an array substrate, a color filter substrate, a liquid crystal layer interposed between the array substrate and the color filter substrate, and a sealant disposed between the array substrate and the color filter substrate to couple the array substrate and the color filter substrate.

To improve a process efficiency of the liquid crystal display device in accordance with automation of the whole process of forming the liquid crystal display device, a titling process is performed on the array substrate for the liquid crystal display device to form an identification mark or a verification code on the array substrate.

However, when the liquid crystal display device has a narrow bezel structure in which a peripheral area of the liquid crystal display panel is reduced, a space required to form the identification mark or the verification code is insufficient.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display panel capable of forming an identification code part without increasing a bezel width.

Additional aspects will be set forth in the detailed description which follows, and, in part, will be apparent from the disclosure, or may be learned by practice of the inventive concept.

Embodiments of the inventive concept provide a display device including a display panel that displays an image and a printed circuit board electrically connected to the display panel to apply a driving signal to the display panel.

The display panel includes a first display substrate that includes a pixel part disposed in a display area and a second display substrate facing the first display substrate. A verification code part is disposed in a peripheral area surrounding the display area while a light blocking layer is disposed to overlap the verification code part when viewed in a plan view. A gray-scale control layer is interposed between the first display substrate and the second display substrate. The first display substrate is disposed at an uppermost position to define a screen in which the image is displayed.

According to the above, when the verification code part is disposed in the light blocking area in which the light blocking layer is formed, the width of the bezel of the pad area may be prevented from increasing due to the verification code part.

In addition, since the verification code part includes a reflective pattern, the verification code part may be formed in the peripheral area rather than the pad area, and thus the position at which the verification code part is formed may not be limited to a specific position.

According to an exemplary embodiment, a display panel includes: a first base substrate including a display area and a peripheral area adjacent to the display area; a signal line disposed on the first base substrate and disposed in the display area; a thin film transistor disposed on the first base substrate and disposed in the display area; a verification code part disposed on the first base substrate and disposed in the peripheral area; a second base substrate facing the first base substrate; and a light blocking layer overlapping the peripheral area in a plan view. The verification code part includes a code portion having an identification mark, and a peripheral portion adjacent to the code portion, in which the light blocking layer overlaps at least a portion of the peripheral portion in a plan view.

According to an exemplary embodiment, a display panel includes: a first display substrate including a thin film transistor disposed in a display area of the first display substrate and a verification code part disposed in a peripheral area of the first display substrate adjacent to the display area; a second display substrate facing the first display substrate; and a light blocking layer overlapping the peripheral area. The verification code part includes at least one of a number and a character; and a portion of the verification code part adjacent to the number or the character overlaps the light blocking layer in a plan view.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept and are incorporated in and constitute a part of this specification, illustrate exemplary embodiments of the invention, and, together with the description, serve to explain the principles of the inventive concept.

The above and other advantages of the present disclosure will become readily apparent by reference to the following detailed description when considered in conjunction with the accompanying drawings wherein.

DETAILED DESCRIPTION OF THE ILLUSTRATED EMBODIMENTS

Figure 1:
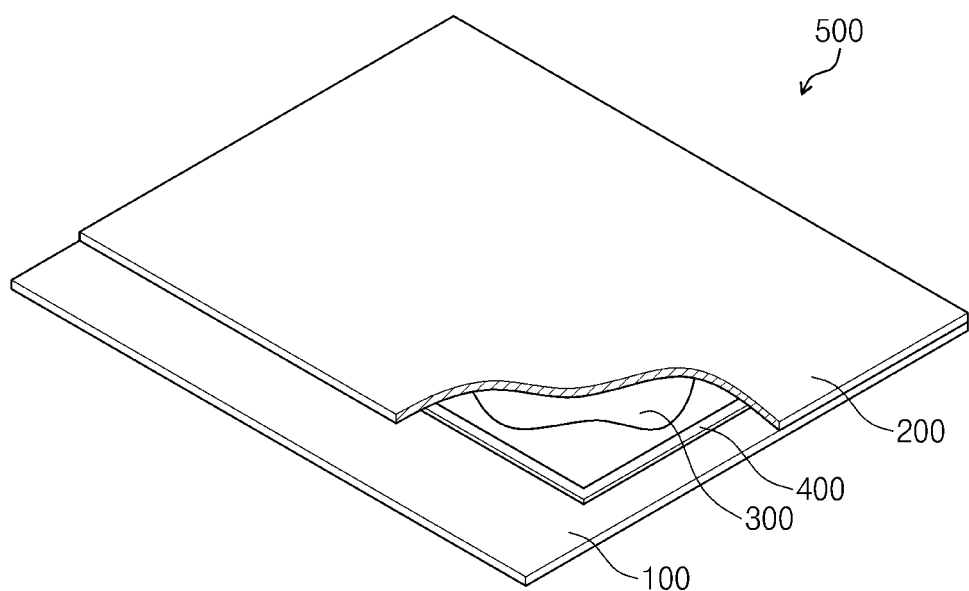
FIG. 1 is a perspective view showing a display panel according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the present invention will be explained in detail with reference to the accompanying drawings.

FIG. 1 is a perspective view showing a display panel according to an exemplary embodiment of the present disclosure.

Referring to FIG. 1, a display panel 500 includes a first display substrate 100, a second display substrate 200, a liquid crystal layer 300, and a sealing member 400.

The first display substrate 100 includes a plurality of pixels and signal lines electrically connected to the pixels. The second display substrate 200 is disposed to face the first display substrate 100, and a portion of the first display substrate 100 is exposed. The liquid crystal layer 300 is interposed between the first and second display substrates 100 and 200, and an alignment of liquid crystal molecules included in the liquid crystal layer 300 is changed by an electric field formed between the first and second display substrates 100 and 200. The sealing member 400 is formed between the first and second display substrates 100 and 200 and seals the liquid crystal layer 300 to prevent the liquid crystal layer 300 from leaking out.

FIG. 1 shows a liquid crystal display panel, which includes the liquid crystal layer 300 between the first and second display substrates 100 and 200 as a gray-scale control layer, as part of the display panel 500, but the display panel 500 is not limited to a liquid crystal display panel. That is, the display panel 500 may be one of a display panel including an organic light emitting element, a display panel including an electrowetting element, a display panel including an electrophoretic element or any other display panel that includes a layer that can be used to form an image for a viewer.

Figure 2:
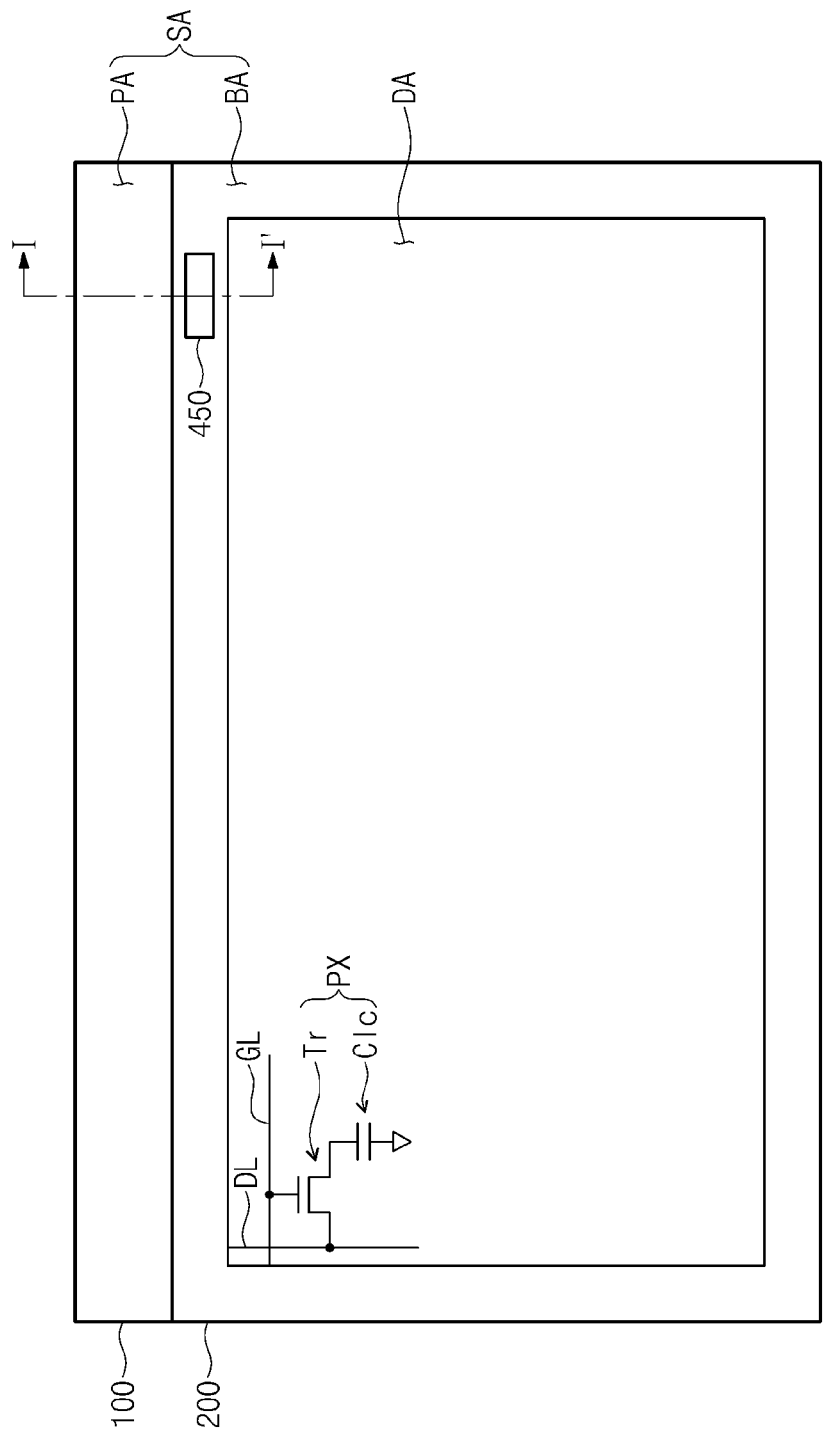
FIG. 2 is a plan view showing the display panel shown in FIG. 1.
Figure 3:
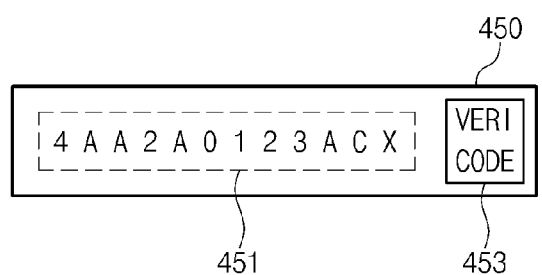
FIG. 3 is an enlarged view showing a verification code part shown in FIG. 2.

FIG. 2 is a plan view showing the display panel shown in FIG. 1 and FIG. 3 is an enlarged view showing a verification code part shown in FIG. 2.

Referring to FIGS. 2 and 3, the display panel 500 includes a display area DA to display the image and a peripheral area SA disposed adjacent to the display area DA to surround the display area DA. The peripheral area SA includes a light blocking area BA surrounding the display area DA and a pad area PA disposed at one side of the light blocking area BA. The light blocking area BA corresponds to an area in which a light blocking layer is formed within an area, in which the first display substrate 100 faces the second display substrate 200, and the pad area PA corresponds to an area of the first display substrate 100, which extends longer than the second display substrate 200 in one direction.

A pixel part is disposed in the display area DA and includes a plurality of pixels PX, a plurality of gate lines, and a plurality of data lines. Each pixel PX includes a thin film transistor Tr connected to a corresponding gate line GL of the gate lines and a corresponding data line DL of the data lines and a liquid crystal capacitor Clc connected to the thin film transistor Tr, but the configuration of each pixel PX should not be limited thereto or thereby.

The light blocking layer (not shown) and the sealing member 400 (see FIG. 1) are disposed in the light blocking area BA. In addition, a verification code part 450 is disposed in the light blocking area BA. The verification code part 450 is disposed in a portion of the light blocking area BA disposed between the pad area PA and the display area DA. As shown in FIG. 3, the verification code part 450 includes a panel identification mark 451 and a verification code 453.

The panel identification mark 451 includes numbers and characters and represents a serial number of the display panel. The verification code 453 includes information about characteristics and history of the display panel and is provided with a veri code. The verification code 453 includes characteristic information of elements of the display panel 500, e.g., the thin film transistor Tr, and information regarding manufacture history of the display panel 500, such as a model name, a place of manufacture, a time of manufacture, etc.

Connection pads (not shown) connected to the data lines may be disposed in the pad area PA.

Figure 4:
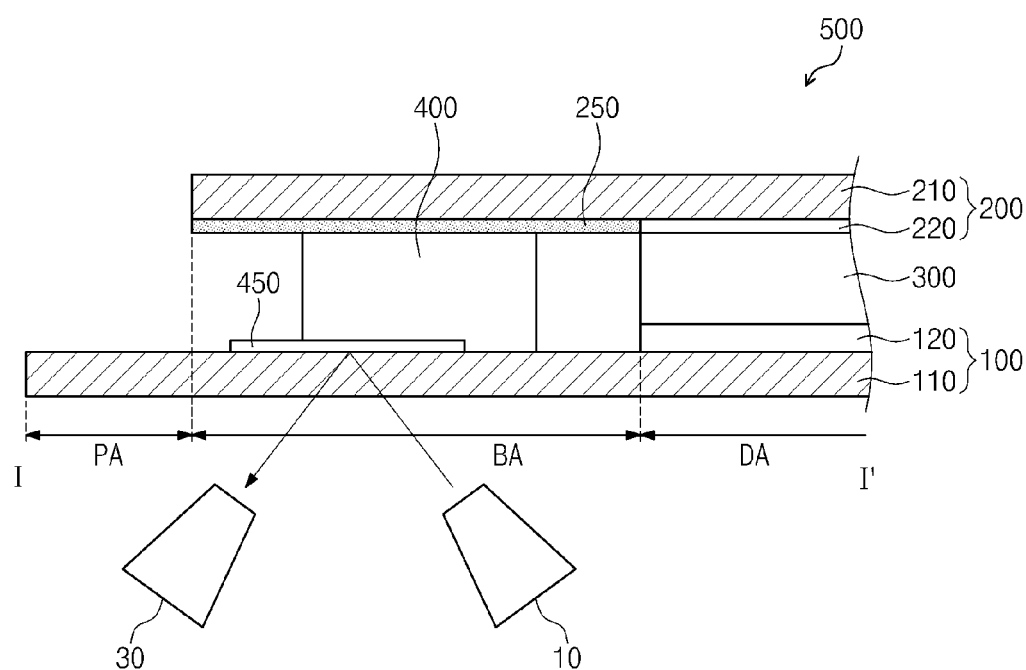
FIG. 4 is a cross-sectional view taken along a line I-I' shown in FIG. 3.

FIG. 4 is a cross-sectional view taken along a line I-I' shown in FIG. 2.

Referring to FIG. 4, the display panel 500 includes the first display substrate 100, the second display substrate 200, the liquid crystal layer 300, the sealing member 400, and the light blocking layer 500.

The first display substrate 100 includes a first base substrate 110 and the pixel part 120 disposed on the first base substrate 110.

The first base substrate 110 includes a transparent material, e.g., glass, quartz, synthetic resin, etc. The first base substrate 110 has a substantially rectangular plate shape when viewed in a plan view. The first base substrate 110 includes the display area DA and the peripheral area SA (best seen in FIG. 2), that includes the light blocking area BA and the pad area PA.

The pixel part 120 is disposed in the display area DA and includes the pixels arranged in a matrix form. The pixel part 120 includes the thin film transistor and a pixel electrode electrically connected to a drain electrode of the thin film transistor. The pixel electrode includes a transparent conductive material.

The first display substrate 100 further includes the verification code part 450 disposed in the light blocking area BA.

The second display substrate 200 includes a second base substrate 210 and a common electrode 220 disposed on the second base substrate 210.

The second base substrate 210 faces the first base substrate 110 and is coupled to the first base substrate 110. The second base substrate 210 is disposed to correspond to the display area DA and the light blocking area BA of the first base substrate 110 and not disposed to overlap the pad area PA. The common electrode 220 is disposed on the second base substrate 210 to correspond to the display area DA.

The second display substrate 200 further includes the light blocking layer 250 disposed on the second base substrate 210 to correspond to the light blocking area BA. The verification code part 450 is fully covered by the light blocking layer 250 when viewed in a plan view.

The sealing member 400 is disposed to correspond to the light blocking area BA and interposed between the first display substrate 100 and the second display substrate 200. Here, the verification code part 450 is partially overlapped with the sealing member 400 when viewed in a plan view.

As an example, the verification code part 450 includes a reflective pattern formed of a metal material. An area of the verification code part 450, in which a mark is engraved, is formed of a metal layer, and the metal layer is removed from the other area of the verification code part 450. Accordingly, a light generated by a light source part 10 is reflected from the area in which the mark is engraved by the verification code part 450, and then provided to the identification part 30. Therefore, the identification part 30 receives the reflected light and decodes the verification code part 450.

When the verification code part 450 is fully covered by the light blocking layer 250 and the verification code part 450 is a transparent pattern, the light provided from the light source part 10 is totally absorbed or reflected by the light blocking layer 250 and not provided to the identification part 30. As a result, the identification part 30 may not decode the verification code part 450.

Thus, when the verification code part 450 is fully covered by the light blocking layer 250, the verification code part 450 is required to be formed in the reflective pattern.

The reflective pattern may be substantially and simultaneously formed with the gate line GL (refer to FIG. 2) or the data line DL (refer to FIG. 2) disposed in the display area DA of the first display substrate 100. Accordingly, the reflective pattern may be formed as the verification code part 450 without requiring a separate process.

Figure 5:
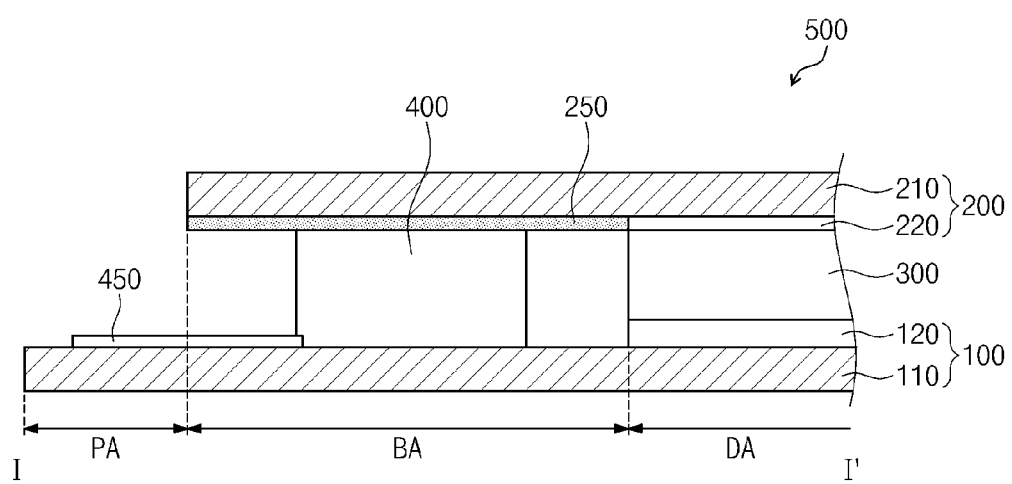
FIG. 5 is a cross-sectional view showing a display panel according to an exemplary embodiment of the present disclosure.

FIG. 5 is a cross-sectional view showing a display panel according to an exemplary embodiment of the present disclosure. In FIG. 5, the same reference numerals denote the same elements in FIG. 4, and thus detailed descriptions of the same elements will be omitted.

Referring to FIG. 5, the verification code part 450 is partially overlapped by the light blocking layer 250 when viewed in a plan view. That is, the verification code part 450 is formed in both the light blocking area BA and the pad area PA, and thus the verification code part 450 is partially covered by the light blocking layer 250 in plan view.

In this case, the verification code part 450 may be one of a reflective pattern formed of a metal material or a transparent pattern including a transparent part. In the case of the reflective pattern, the area of the verification code part 450, in which the mark is engraved, is formed of a metal layer, and the metal layer is removed from the other area of the verification code part 450. In the case of a transparent pattern, the metal layer is removed from the area of the verification code part 450, in which the mark is engraved, and the other area of the verification code part 450 is formed of the metal layer. When the verification code part 450 includes a reflective pattern, the light source part 10 and the identification part 30 (see FIG. 4) are disposed adjacent the first display substrate 100, but when the verification code part 450 includes the transparent pattern, the light source part 10 and the identification part 30 are respectively disposed adjacent the first and second display substrates 100 and 200.

Figure 6:
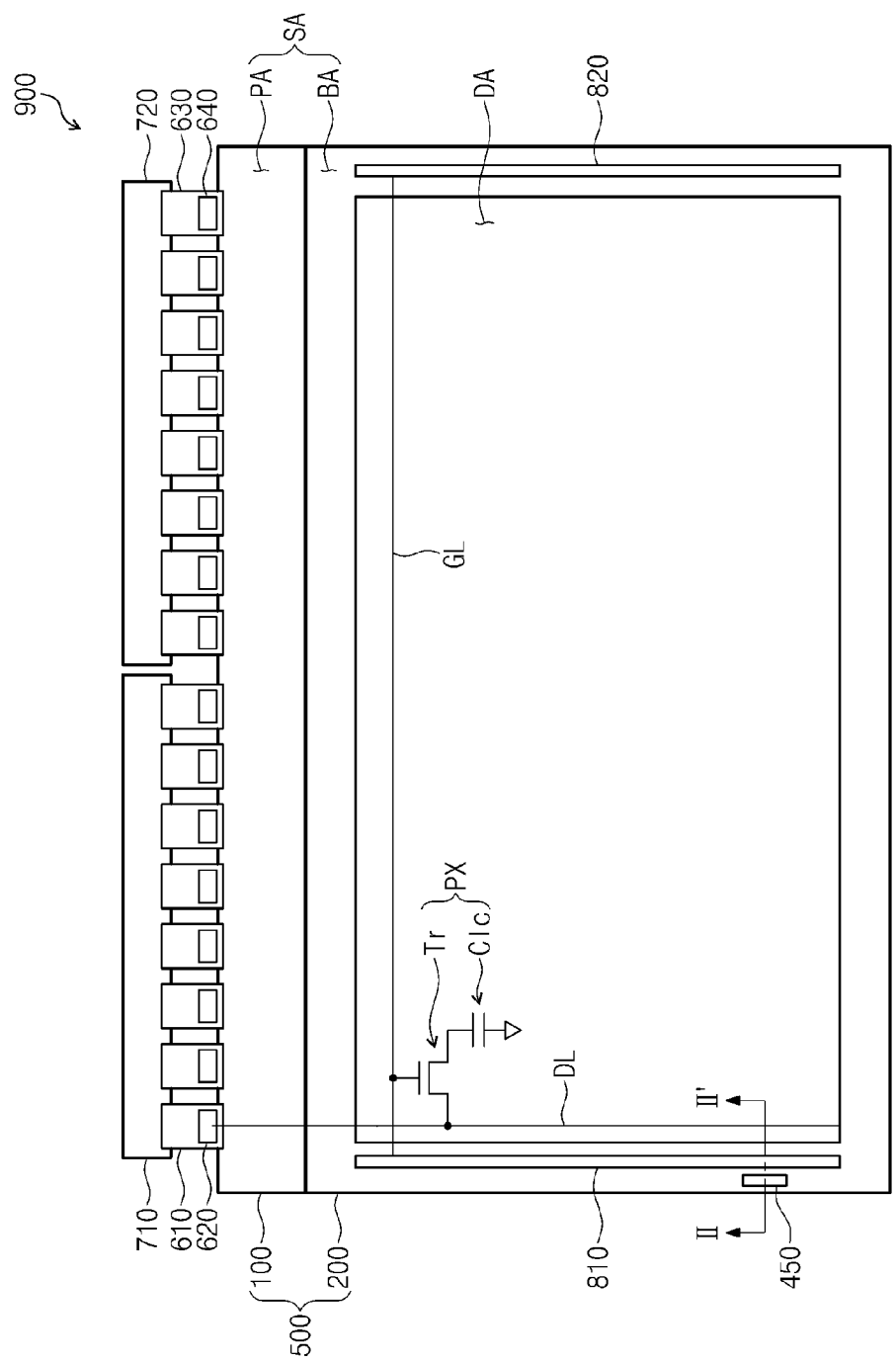
FIG. 6 is a plan view showing a display unit according to an exemplary embodiment of the present disclosure.
Figure 7:
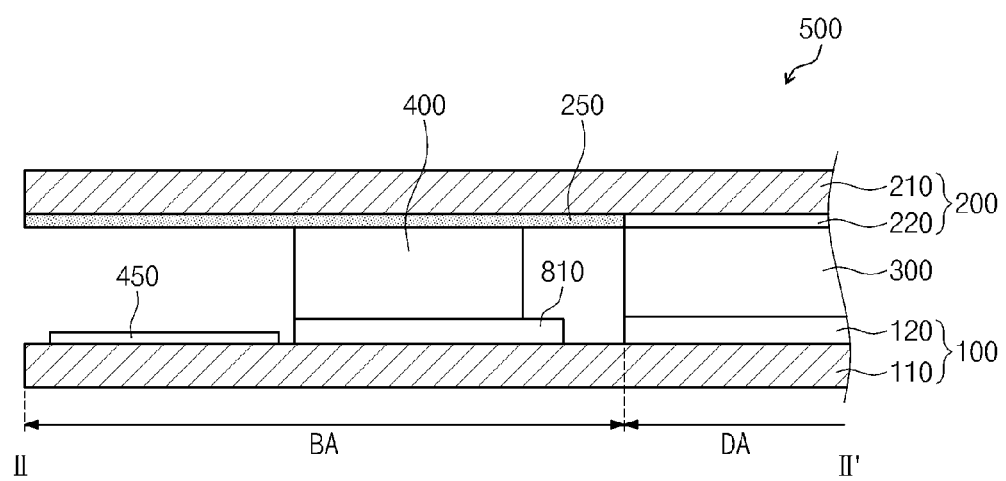
FIG. 7 is a cross-sectional view taken along a line II-II' shown in FIG. 6.

FIG. 6 is a plan view showing a display unit according to an exemplary embodiment of the present disclosure and FIG. 7 is a cross-sectional view taken along a line shown in FIG. 6.

Referring to FIG. 6, a display unit 900 includes a display panel 500, first and second printed circuit boards 710 and 720, and first and second tape carrier packages 610 and 630 (hereinafter, referred to as TCP). The display panel 500 includes first and second display substrates 100 and 200, and first and second gate driving circuits 810 and 820 are integrated in the first display substrate 100.

The display panel 500 includes a display area DA to display the image and a peripheral area SA disposed adjacent to the display area DA to surround the display area DA. The peripheral area SA includes a light blocking area BA surrounding the display area DA and a pad area PA disposed at one side of the light blocking area BA. The light blocking area BA corresponds to an area in which a light blocking layer is formed within an area, in which the first display substrate 100 faces the second display substrate 200, and the pad area PA corresponds to an area of the first display substrate 100, which extends longer than the second display substrate 200 in one direction.

A pixel part is disposed in the display area DA and includes a plurality of pixels PX, a plurality of gate lines GL, and a plurality of data lines DL. Each pixel PX includes a thin film transistor Tr connected to a corresponding gate line of the gate lines GL and a corresponding data line of the data lines DL and a liquid crystal capacitor Clc connected to the thin film transistor Tr, but the configuration of each pixel PX should not be limited thereto or thereby.

The first and second gate driving circuits 810 and 820 are disposed on the first display substrate 100 to correspond to the light blocking area BA. In particular, the first gate driving circuit 810 is disposed adjacent to one end of the gate lines GL and the second gate driving circuit 820 is disposed adjacent to the other end of the gate lines GL.

Each of the first and second gate driving circuits 810 and 820 is connected to the gate lines GL to apply a gate signal to the gate lines GL. The gate signal is applied to the thin film transistor Tr through the gate lines GL to turn on or off the thin film transistor Tr. Each of the first and second gate driving circuits 810 and 820 includes a plurality of driving transistors substantially and simultaneously formed with the thin film transistor Tr.

In the present exemplary embodiment, the first and second gate driving circuits 810 and 820 are respectively formed at both ends of the gate lines GL, but the first and second gate driving circuits 810 and 820 may be disposed adjacent to one end of the gate lines GL.

The verification code part 450 is disposed adjacent to one of the first and second gate driving circuits 810 and 820. In FIGS. 6 and 7, the verification code part 450 is disposed adjacent to the first gate driving circuit 810, but it should not be limited thereto or thereby.

As shown in FIG. 7, the verification code 450 is disposed in the light blocking area BA and fully covered by the light blocking layer 250. In addition, the verification code part 450 is disposed not to overlap with the first gate driving circuit 810 when viewed in a plan view. As another example, the verification code part 450 may be disposed to overlap with one of the first and second gate driving circuits 810 and 820.

As an example, the verification code part 450 includes a reflective pattern formed of a metal material. An area of the verification code part 450, in which a mark is engraved, is formed of a metal layer, and the metal layer is removed from the other area of the verification code part 450. Accordingly, a light generated by a light source part 10 is reflected from the area in which the mark is engraved by the verification code part 450, and then provided to the identification part 30 (please see the configuration of FIG. 4). Therefore, the identification part 30 receives the reflected light and decodes the verification code part 450.

As seen in FIG. 6, the first and second printed circuit boards 710 and 720 are disposed adjacent to the pad area PA of the display panel 500. The first printed circuit board 710 is electrically connected to the display panel 500 through the first TCPs 610 and the second printed circuit board 720 is electrically connected to the display panel 500 through the second TCPs 630. The first and second TCPs 610 and 630 are attached to the pad area PA of the first display substrate 100.

First driving chips 620 are respectively mounted on the first TCPs 610 and second driving chips 640 are respectively mounted on the second TCPs 620. The first and second driving chips 620 and 640 are electrically connected to the data lines DL to apply a data signal to the data lines DL. The data signal is applied to the thin film transistor Tr through the data lines DL and applied to the liquid crystal capacitor Clc when the thin film transistor Tr is activated.

Figure 8:
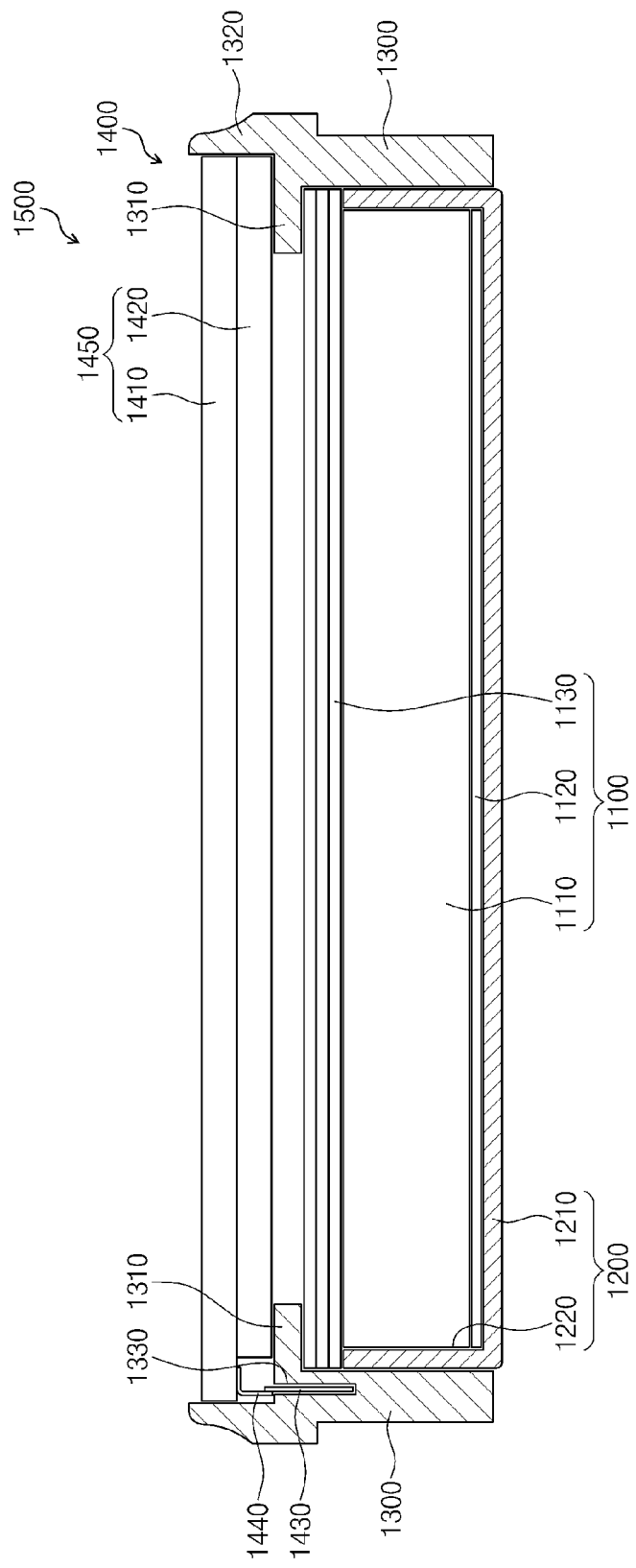
FIG. 8 is an assembled cross-sectional view showing a display device according to an exemplary embodiment of the present disclosure.

FIG. 8 is an assembled cross-sectional view showing a display device according to an exemplary embodiment of the present disclosure.

Referring to FIG. 8, a display device 1500 includes a display unit 1400, a backlight unit 1100, a bottom chassis 1200, and a mold frame 1300.

The display unit 1400 includes a display panel 1450 to display an image, a printed circuit board 1430 to apply a driving signal to display panel 1450, and a flexible film 1440 to electrically connect the display panel 1450 to the printed circuit board 1430.

The display panel 1450 includes a first display substrate 1410 including a plurality of pixels formed thereon, a second display substrate 1420 facing the first display substrate 1410 while being coupled to the first display substrate 1410, and a liquid crystal layer (not shown) interposed between the first display substrate 1410 and the second display substrate 1420.

When viewed in a plan view, a driving chip (not shown) may be disposed at at least one side of the first display substrate 1410 to apply a data signal to the data line. The driving chip generates the data signal applied to the data line of the display panel 1450 in response to external signals. The external signals are provided from the printed circuit board 1430 and include image signals, various control signals, and driving voltages.

The first display substrate 1410 includes a gate driving circuit disposed at the other side of the first display substrate 1410 to apply a gate signal to the gate line. The gate driving circuit may be formed at the other side of the first display substrate 1410 through a thin film process used to form the first display substrate 1410. Therefore, the gate driving circuit may be built in the display panel 1450.

The backlight unit 1100 includes a light source part (not shown) to generate the light and a light guide plate 1110 to guide the light from the light source part to the display unit 1400.

In the present exemplary embodiment, the backlight unit 1100 may be an edge-illumination type backlight unit. That is, the light source part of the backlight unit 1100 is disposed at a lower portion of the display panel 1400 and provides the light to at least one side surface of the light guide plate 1110, and the light guide plate 1110 guides the light to the display panel 1400.

The light guide plate 1110 has a substantially rectangular plate shape and provides the light incident thereto through the side surface to the display panel 1450.

The backlight unit 1100 further includes a plurality of optical sheets 1130 disposed between the light guide plate 1110 and the display panel 1450 and a reflective plate 1120 disposed under the light guide plate 1110.

The optical sheets 1130 include a diffusion sheet to diffuse the light and at least one light-condensing sheet to condense the light, and thus brightness and viewing angle of the light exiting from an exit surface of the light guide plate 1110 are improved. Although not shown in figures, the optical sheets 1130 further include a protective sheet disposed at an uppermost position thereof. The reflective plate 1120 is disposed under the light guide plate 1110 and reflects the light leaking out from the light guide plate 1110, and the reflected light by the reflective plate 1120 is re-incident to the light guide plate 1110.

The bottom chassis 1200 includes a bottom portion 1210 on which the light source part, the reflective plate 1120, and the light guide plate 1110 are disposed and a sidewall 1220 extending from the bottom portion 1210 in a vertical direction with respect to the bottom portion 1210. As an example, the bottom chassis 1200 may be formed of a metal material having flexibility.

The mold frame 1300 is interposed between the display unit 1400 and the backlight unit 1100 to support the display panel 1450. The mold frame 1300 includes a supporter 1310 to support the display panel 1450 and a sidewall 1320 extending from the supporter 1310 in a vertical direction with respect to the supporter 1310.

The supporter 1310 is provided with a receiving recess 1330 formed substantially in parallel to the sidewall 1320 to accommodate the printed circuit board 1430.

As shown in FIG. 8, the supporter 1310 supports the second display substrate 1420 of the display panel 1450. The second display substrate 1420 is disposed between the first display substrate 1410 and the backlight unit 1100, and the first display substrate 1410 is disposed at an uppermost position to expose an upper surface thereof to the outside.

The flexible film 1440 attached to the pad area of the first display substrate 1410 is bent downwardly, and the printed circuit board 1430 attached to the flexible film 1440 is accommodated in the receiving recess 1330 and disposed to be substantially in parallel to the sidewall 1320.

Although not shown in figures, a fixing tape (not shown) may be further attached to an edge of the upper surface of the display panel 1450 to fix the display panel 1450 to the mold frame 1300.

Although not shown in figures, the display device 1500 may further include a top chassis coupled to the mold frame 1300 to cover an edge of the display panel 1450 instead of the fixing tape.

Figure 9:
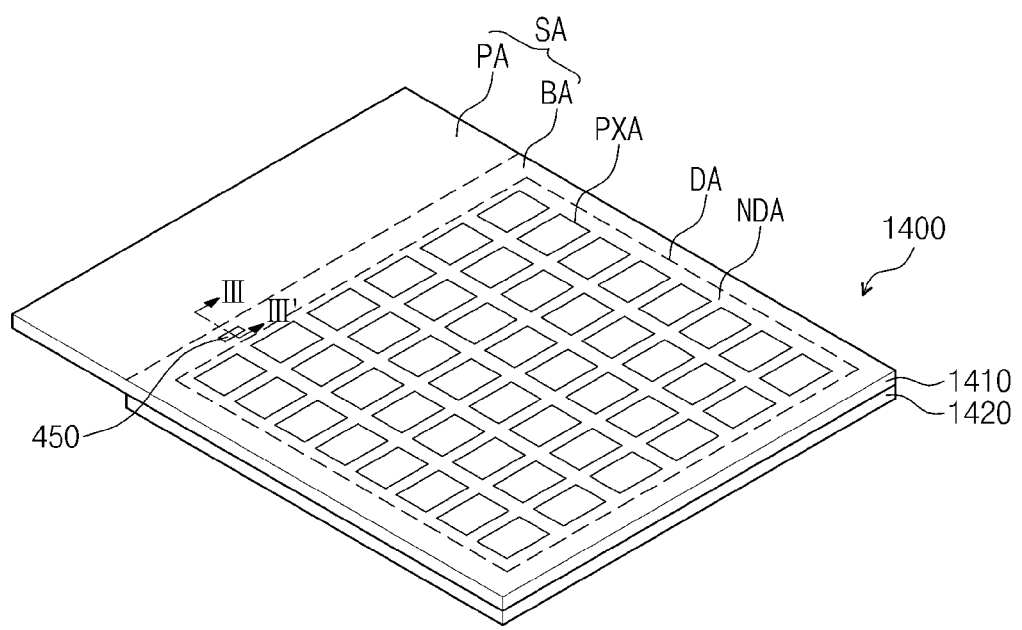
FIG. 9 is a perspective view showing a display panel shown in FIG. 8.
Figure 10:
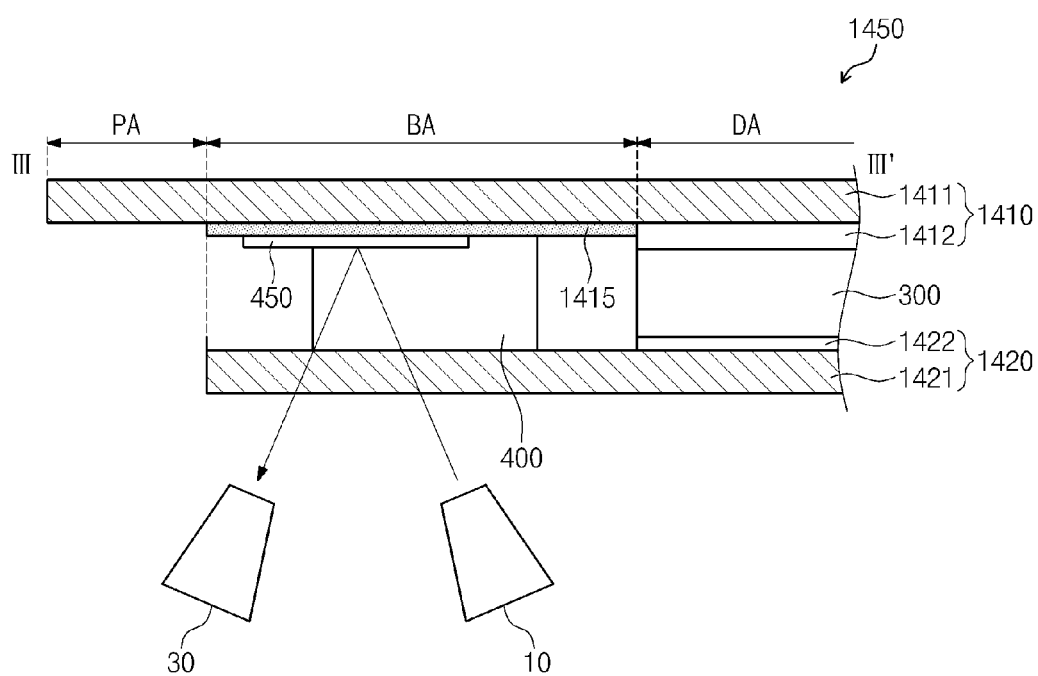
FIG. 10 is a cross-sectional view taken along a line shown in FIG. 9.

FIG. 9 is a perspective view showing a display panel shown in FIG. 8 and FIG. 10 is a cross-sectional view taken along a line shown in FIG. 9.

Referring to FIG. 9, the first display substrate 1410 includes a display area DA and a peripheral area SA. The display area DA displays the image. The display area DA includes a plurality of pixel areas PXA and a non-display area NDA.

The pixels are respectively disposed in the pixel areas PXA of the display area DA. The pixel areas PXA are spaced apart from each other. In the present exemplary embodiment, the pixels are disposed on the first display substrate 1410.

The gate lines, data lines, and thin film transistors are disposed in the non-display area NDA and the image is not displayed in the non-display area NDA.

The peripheral area SA includes the light blocking area BA and the pad area PA and the image is not displayed in the peripheral area SA. The light blocking area BA surrounds the display area DA when viewed in a plan view. The pad area PA is defined in the first display substrate 1410 and exposed by the second display substrate 1420. Driving chips are directly arranged in the pad area PA or a separate flexible film is coupled to the pad area PA.

The verification code part 450 is disposed on the first display substrate 1410 to correspond to the light blocking area BA.

Referring to FIGS. 9 and 10, the display panel 1450 includes the first display substrate 1410, the second display substrate 1420, the liquid crystal layer 300, the sealing member 400, and a light blocking layer 1415.

The first display substrate 1410 includes a first base substrate 1411 and a pixel part 1412 disposed on the first base substrate 1411.

The first base substrate 1411 includes a transparent material, e.g., glass, quartz, synthetic resin, etc. The first base substrate 1411 has a rectangular plate shape when viewed in a plan view. The first base substrate 1411 includes the display area DA and the peripheral area SA, and the peripheral area SA includes the light blocking area BA and the pad area PA.

The pixel part 1412 is disposed in the display area DA and includes the pixels arranged in a matrix form. The pixel part 1412 includes the thin film transistor and a pixel electrode electrically connected to a drain electrode of the thin film transistor. The pixel electrode includes a transparent conductive material.

The first display substrate 1410 further includes the verification code part 450 disposed in the light blocking area BA. The first display substrate 1410 further includes the light blocking layer 1415 disposed on the first base substrate 1411 to correspond to the light blocking area BA. The verification code part 450 is disposed on the light blocking layer 1415 and fully covered by the light blocking layer 1415 when viewed in a plan view.

The second display substrate 1420 includes a second base substrate 1421 and a common electrode 1422 disposed on the second base substrate 1421.

The second base substrate 1421 faces the first base substrate 1411 and is coupled to the first base substrate 1411. The second base substrate 1421 is disposed to correspond to the display area DA and the light blocking area BA of the first base substrate 1411 and not disposed in the pad area PA. The common electrode 1422 is disposed on the second base substrate 1421 to correspond to the display area DA.

The sealing member 400 is disposed to correspond to the light blocking area BA and interposed between the first display substrate 100 and the second display substrate 200. Here, the verification code part 450 partially overlaps the sealing member 400 when viewed in a plan view.

As an example, the verification code part 450 includes a reflective pattern formed of a metal material. An area of the verification code part 450, in which a mark is engraved, is formed of a metal layer, and the metal layer is removed from the other area of the verification code part 450. In this case, the light source part 10 (refer to FIG. 4) and the identification part 30 (refer to FIG. 4) are disposed adjacent the second display substrate 1420. Accordingly, the light generated by the light source part 10 is reflected from the area in which the mark is engraved by the verification code part 450, and then provided to the identification part 30. Therefore, the identification part 30 receives the reflected light and decodes the verification code part 450.

Figure 11:
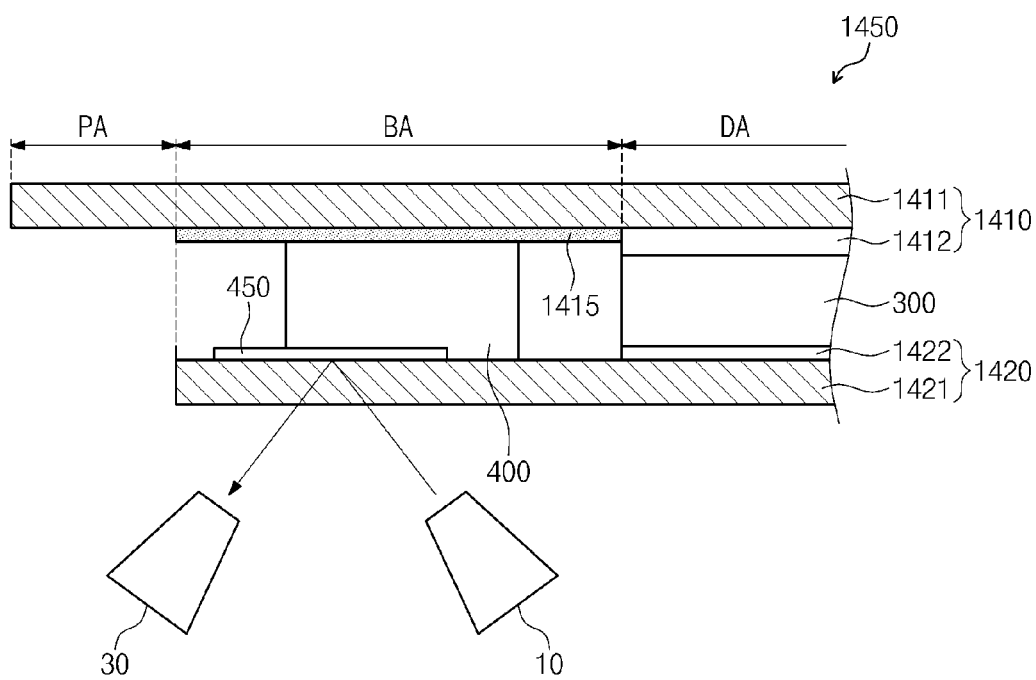
FIG. 11 is a cross-sectional view showing a display panel according to an exemplary embodiment of the present disclosure.

FIG. 11 is a cross-sectional view showing a display panel according to an exemplary embodiment of the present disclosure. In FIG. 11, the same reference numerals denote the same elements in FIG. 10, and thus detailed descriptions of the same elements will be omitted.

Referring to FIG. 11, the second display substrate 1420 includes the verification code part 450 disposed in the light blocking area BA. That is, the display panel 1450 shown in FIG. 11 has the same structure and function as those of the display panel 1450 shown in FIG. 10 except that the verification code part 450 is disposed on the second display substrate 1420.

In the version of FIG. 11, the light blocking layer 1415 is disposed on the first display substrate 1410 to correspond to the light blocking area BA. The verification code part 450 is fully covered by the light blocking layer 1415 when viewed in a plan view.

In this case, the verification code part 450 includes a reflective pattern formed of a metal material. An area of the verification code part 450, in which a mark is engraved, is formed of a metal layer, and the metal layer is removed from the other area of the verification code part 450.

The light source part 10 (refer to FIG. 4) and the identification part 30 (refer to FIG. 4) are disposed adjacent the second display substrate 1420. Accordingly, the light generated by the light source part 10 is reflected from the area in which the mark is engraved by the verification code part 450, and then provided to the identification part 30. Therefore, the identification part 30 receives the reflected light and decodes the verification code part 450.

Although not shown in FIG. 11, when the light blocking layer 1415 is disposed on the second base substrate 1421, the verification code part 450 is disposed on the light blocking layer 1415 or disposed on the first base substrate 1411 to correspond to the light blocking layer 1415. In this case, the verification code part 450 includes the reflective pattern, and the light source part 10 and the identification part 30 are disposed on the first display substrate 1410. These embodiments are similar to the embodiments of FIGS. 10 and 11 but with the position of the light blocking layer changed to the second base substrate 1421 rather than the first base substrate 1411 as shown.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display panel comprising:
   a first base substrate comprising a display area and a peripheral area adjacent to the display area;
   a signal line disposed on the first base substrate and disposed in the display area;
   a thin film transistor disposed on the first base substrate and disposed in the display area;
   a verification code part disposed on the first base substrate and disposed in the peripheral area;
   a second base substrate facing the first base substrate; and
   a light blocking layer overlapping the peripheral area in a plan view,
   wherein the verification code part comprises:
      a code portion having an identification mark; and
      a peripheral portion adjacent to the code portion, and
   wherein the light blocking layer overlaps at least a portion of the peripheral portion in a plan view.

2. The display panel of claim 1, wherein the verification code part comprises a metal layer.

3. The display panel of claim 2, wherein at least a portion of the verification code part does not comprise the metal layer.

4. The display panel of claim 1, wherein the identification mark comprises at least one of a number and a character.

5. The display panel of claim 1, wherein:
   the signal line comprises a gate line connected to the thin film transistor and a data line connected to the thin film transistor; and
   the verification code part and the gate line comprise the same metal material.

6. The display panel of claim 1, wherein a portion of the verification code part does not overlap the light blocking layer in a plan view.

7. A display panel comprising:
   a first display substrate comprising:
      a thin film transistor disposed in a display area of the first display substrate; and
      a verification code part disposed in a peripheral area of the first display substrate adjacent to the display area;
   a second display substrate facing the first display substrate; and
   a light blocking layer overlapping the peripheral area,
   wherein:
      the verification code part comprises at least one of a number and a character; and a portion of the verification code part adjacent to the number or the character overlaps the light blocking layer in a plan view.

* * * * *